United States Patent Office

Re. 27,111
Reissued Mar. 30, 1971

27,111

PITCH-BONDED REFRACTORY COMPOSITION

Roger E. Wilson, Silver Spring, Md., assignor to Basic Incorporated, Cleveland, Ohio Original No. 3,236,664, dated Feb. 22, 1966, Ser. No. 187,188, Apr. 13, 1962. Application for reissue Mar. 19, 1969, Ser. No. 822,075
Int. Cl. C04b *35/04, 35/52*
U.S. Cl. 106—56 18 Claims

Matter enclosed in heavy brackets [ ] appears in the original patent but forms no part of this reissue specification; matter printed in italics indicates the additions made by reissue.

*ABSTRACT OF THE DISCLOSURE*

*A pitch-bonded refractory composition having high strength and increased density comprising basic refractory particles, about 4% to about 10% by weight based on the weight of the total admixture of a carbonaceous material to bind said particles together, and approximately 0.5 to about 10% by weight based on the weight of the total admixture of a finely divided carbon black, at least a part of said carbon black being thermal black.*

The present invention relates to a bonded refractory and, more particularly, to a carbon-bonded dead-burned refractory having improved physical properties for use at elevated temperatures.

The change within the steel producing industry from the open-hearth process of making steel to the relatively new basic oxygen steel-making processes has made demands upon the refractory industry for new and improved furnace lining materials. Preformed brick or block refractories and ramming mixes compounded from dead-burned granular materials such as dead-burned dolomite, dead-burned magnesia, or mixtures thereof, and bonded with a carbonaceous binder obtained from coal-tar pitch have been used as the refractories for these new basic oxygen converters and for other steel-making furnaces. Ever increasing demands, however, by the steel producers for increased furnace life of these pitch-bonded refractory materials have necessitated the continued improvement of such refractories.

The use of coal-tar pitch as a carbonaceous binder capable of undergoing a pyrolytic decomposition to form a carbon bond for various high-temperature-resistant products has long been practiced in certain fields of manufacture and is currently being used in the production of specialized refractory materials. In accordance with the present invention, substantial improvements in the furnace service life of these pitch-bonded granular basic refractories, such as dead-burned dolomite or dead-burned magnesia, can be made by incorporating relatively small amounts of carbon black into the granular refractory formulation.

It is, therefore, a principal object of the present invention to provide an improved method of forming a bonded refractory and the refractory produced thereby.

Another object is to provide an improved method of forming a green, unfired pitch-bonded basic refractory, which may be stored as such if desired, and later baked pyrolytically to decompose the pitch and form a carbon-bonded refractory.

A further object is to provide an improved coal tar pitch-bonded basic refractory composed, for example, of dead-burned dolomite, dead-burned magnesia, or mixtures thereof which may be used as a ramming mix.

A still further object is to provide an improved ramming mix as just described which can be molded or pressed into various desired shapes for use as brick or block in a basic oxygen converter or other steel producing furnaces.

Other objects of the invention will become apparent as the description proceeds.

To the accomplishment of the foregoing and related ends, the invention consists of the features hereinafter fully described and particularly pointed out in the claims, the following disclosure describing in detail the invention, such disclosure illustrating, however, but one or more of the various ways in which the invention may be practiced.

In carrying out the present invention, refractory particles are admixed with a carbonaceous material, capable of pyrolytically decomposing to form a carbon bond, and also with a relatively small amount of carbon such as carbon black. The admixture may be used in this form, for example, as a ramming mix. Usually, however, the admixture is shaped such as by pressure into a desired form, for instance, a brick or block form. A "green" ramming mix or shaped article may either be used immediately or stored and later employed for the repair or lining, respectively, of a furnace wall or bottom. By subsequently bringing the furnace to an operating temperature, the carbonaceous material in the mix or brick is pyrolytically decomposed or "coked" and forms a carbon bond within the mix or brick as installed in the furnace. If desired, especially in the case of the brick, the coking can be performed separately prior to installation in a furnace.

In both the green and coked or baked states, the presence of the carbon black has been found to improve the physical properties of the mix or blend particularly as to oxidation, crushing strength (bond strength), and density. The exact function of the added powdered carbon material in improving the bonded refractory is not clearly known. The introduction of carbon into the granular refractory formulation apparently increases the binding properties of the pitch bond and as a result reinforces the structure of the carbon bond formed by the pyrolytic cracking of the pitch.

Refractory particles employed in accordance with the present invention are desirably dead-burned refractories, that is, those that have been calcined to a dense sintered state. Preferably basic refractories are employed such as dead-burned dolomite, dead-burned magnesia, and mixtures thereof.

As indicated, the carbonaceous material employed is one which leaves a carbon residue when subjected to pyrolytic decomposition or cracking. This may be at temperatures ranging from about 700° F. to about 1850° F. Within this temperature range, a carbon film is formed around and between the granular refractory particles by the cracking of the carbonaceous material to bond the particles one to another. The carbon film formation typically takes place inwardly from an exposed surface of the refractory, for example, by the heat of a steel-making reaction within a basic oxygen converter or furnace, the inward extent depending on conditions of exposure. Evaluation of any pitch-bonded refractory is, therefore, performed on specimens which have been heated to undergo pyrolytic decomposition or "coking" of the pitch binder, using the compressive crushing strength of the resulting refractories as a criterion of comparison.

Preferably, the carbonaceous materials employed are pitches and especially those derived from coal tar. For example, such coal tar pitches have softening points of about 40° C. to about 100° C. as measured by the A.S.T.M. Method of Test D–36–26. In some instances coal tar itself is used for bonding such refractories, although usually coal tar pitch is preferred as it is essentially free of the lower boiling constituents ordinarily found in coal tar. Some of the bituminous asphalts may be used provided they have the property of decomposing rolytically to form a substantial carbon residue. Many phalts do not have this property but rather distill in eir entirety upon heating and therefore are not usable. onsequently, the coal tar pitches are more generally used the binder in this type of refractory brick, since such tches are less expensive and have the desirable characristic of yielding a larger proportion of carbon upon acking.

All of the various kinds of carbon blacks known in the t can be used. Other pulverulent carbons of non-cubic ystalline structure may also be used in practicing the vention. For example, pulverized finely-divided coal d coke or graphite may be used, but such carbons are t as efficacious as carbon blacks. Exemplary carbon acks include lamp blacks, channel blacks, gas or oil-rnace combustion blacks, thermal blacks, acetylene acks, and the like. Some of these blacks are also known impingement blacks. Further, such blacks may be ed individually or in combination in being added to a anular basic refractory formulation to improve the ked crushing strength of the product along with the nsity and other desirable properties.

The designations of different types of carbon blacks entioned in the preceding paragraph are all art recogzed terms. Descriptions of carbon blacks may be found, r example, in "Encyclopedia of Chemical Technology," Kirk and Othmer, The Interscience Encyclopedia, Inc., ew York, 1949, volume 3, pages 34 to 60. A further scription of kinds and sources of carbon blacks is given U.S. Patent No. 2,527,595 to Swallen et al. Both the xt and patent citations are hereby incorporated by ference.

Carbon blacks comprise a group of extremely finely vided types of non-crystalline carbon composed of parle sizes at sub-grinding levels. These blacks are also own as colloidal carbons because of their small particle es and behavior in aqueous and liquid organic media. owever, there are some carbon blacks also within the ntemplation of the present invention whose particle size ay be outside what is generally considered to be the per limit of colloidal sizes. The carbon blacks include oducts from various commercial processes in which drocarbons are subjected to partial combustion and to non-oxidizing thermal treatment. Several types are oduced which differ from one another in particle size. e various types may differ markedly with little regard particle size in other respects, for example, some blacks e composed of very dense well defined particles, while hers consist of rather flocculent particles agglomerated to porous masses.

The carbon blacks which have been found to be most eful in practicing the invention have properties within e following ranges:

| | |
|---|---|
| verage particle diameter | 20 to 500 millimicrons. |
| rface area | 5 to 375 square meters per gram. |
| olatile content | Less than 14% by weight. |
| xed carbon | 85 to 99.5% by weight. |

The following Table A lists specific kinds of carbon acks which have been used:

graphs of the blacks. The oil absorptions were measured by the "Cabot Coherent Ball Method" using linseed oil. This value is a relative measure of the structure of the black and oil needed for its saturation. The volatile content of a black is related to the amount of chemisorbed oxygen which is present on the carbon surface. The pH value of carbon black is determined with a glass electrode in a carbon black-water sludge, A.S.T.M. designation: D-1512. Under these condtions the pH is related to the amount of carbon oxygen complexes on the surface of the carbon black. A relatively high amount of these complexes results in a low pH. The apparent density indicates the amount of storage or shipping space a given black will occupy.

Carbon blacks of the type shown in Table A are manufactured by the Cabot Corporation of Boston, Massachusetts, and sold under the following trade names: Elf, Mogul, Vulcan, and Sterling. Various grade designations may accompany such trade names.

The amount of carbonaceous material such as coal tar pitch used to bond refractory particles is important in that higher contents of pitch and the like provide better coked strength and better performance of the refractory in a furnace. However, the increased amounts of pitch likewise increase the difficulty of manufacture and storage of the bonded refractory.

For example, if too much pitch is used, the mixed particles and pitch are difficult to handle because the mixture becomes so sticky. Further, such a mixture does not retain a pressed shape. Since the coal tar pitch is molten at this stage, the particles-pitch mixture is too fluid to handle if excess pitch is present. The mixture behaves as a plastic deformable glob which does not hold its shape. Also when released from a mold, the pressure decrease tends to result in cracks. On the other hand, if the mold parts or other apparatus used to impart the shape is maintained in a closed position until the pitch cools and sets, not only does sticking of the refractory to the mold parts result, but the overall process becomes much too slow for commercial application. Accordingly, for a given refractory there is a maximum pitch tolerance or capacity which balances the extremes of sufficient pitch to provide a desired bond and a mixture which retains a shape imparted by pressing.

As one modification of the present invention, it has been found that a blend of two particular carbon blacks, employed as an additive as herein disclosed, increases the pitch tolerance or allowable maximum capacity, other factors being the same. Such a blend includes a high oil absorbing carbon black and a thermal carbon black, especially a fine thermal black. This blend provides the greatest increase in green and coked strength of a refractory over any other carbon black used separately.

The high oil aborbing black may be either a long flow channel carbon black or a conductive oil furnace carbon black. In either case, an absorptivity of at least 85 pounds of oil per 100 pounds of black is preferred. Normally the thermal carbon blacks, which are of relatively coarser particle size, are desirable from the standpoint of imparting strength. However, thermal blacks are the poorest from the viewpoint of pitch tolerance and may even

TABLE A

| rbon type | Surface area, $M^2/g$. | Particle Diameter [mm]$m\mu^2$ | Oil absorption, /100 #blk. | Volatile content, percent | Fixed carbon, percent | pH | Apparent density, /Ft.$^3$ |
|---|---|---|---|---|---|---|---|
| gular channel | 105–140 | 22–29 | 125–130 | 5.0 | 95.0 | 4.5–5 | 10–14 |
| dium flow channel | 200–210 | 23–25 | 105–130 | 7–7.5 | 92.5–93 | 4.0 | 11 |
| w flow channel | 295–360 | 22–28 | 88–94 | 12–13 | 87–88 | 3.5 | 12 |
| nductive oil furnace | 125–210 | 21–29 | 130–250 | 1.5–2.0 | 98–98.5 | 8–8.5 | 6 |
| l furnace | 30–125 | 20–56 | 80–115 | 1–1.5 | 98.5–99 | 8.5–9 | |
| s furnace | 23–30 | 60–80 | 70–80 | 1.0 | 99.0 | 9.5–10 | 18 |
| ermal | 6–13 | 180–470 | 33–38 | 0.5 | 99–5 | 8.5–9 | 31–33 |

The surface areas listed were determined by the nitron adsorption using the method of Brunauer-Emmetteller, known in the art. The particle diameters are ithmetic mean diameters measured from electron microdecrease pitch tolerance. Consequently, the stated blend is not only efficacious in providing a desirable strength but also in raising the pitch tolerance of the refractory.

The defined blend of carbon blacks may comprise from about 1:2 to 2:1 parts by weight of the high oil absorbing black to the thermal black, respectively, *or about 66% to about 33% by weight thermal black.* Preferably equal parts by weight of each are used. It is thought that the high oil absorping black contributes the enhanced pitch tolerance, while the thermal black contributes the requisite strength, such that there is a true synergistic cooperation between the two. Increases in permissive pitch content of one percent to 1.5 percent by weight have been possible with the use of the defined blend without being confronted with any of the problems usually attendant such increased use of pitch.

In general, dead-burned basic refractory particles of the type indicated are first blended with a carbon black. Any amount of a carbon black provides some advantage, but usually an amount ranging from about 0.5 percent to about ten percent is used, based on the weight of the total admixture to be ultimately prepared and preferably about one percent to about three percent. The blend or mixture is then heated from about 225° F. to about 325° F., as an example, and then admixed with the carbonaceous material such as coal tar pitch in an amount from about four percent to about 10 percent by weight, also based on the weight of the total admixture. The pitch is preferably preheated to a temperature which renders it only sufficiently fluid to mix readily with the refractory particles.

If the final admixture is not to be used as a ramming mix, it is molded into a desired shape, such as a brick shape, by pressing at high pressure, for example, 10,000 p.s.i., and/or by intensive tamping or vibration. After pressing, the shaped refractory is cooled on suitable flat supports to such a temperature that the pitch stiffens and the refractory is not subject to deformation upon handling. Upon being placed in the furnace or other place of use, the coal tar pitch is converted to a tough and strong carbon bond by rapidly heating the refractory to temperatures of the order of 2000° F. or even to working temperature of the order of 3000° F. As the temperature of the brick mass passes through the zone of 500° F. to 1800° F. the coal tar pitches are cracked or "coked" by pyrolytic reactions such as take place in the cracking towers for petroleum or as occurs in the manufacture of carbon electrodes which also have an initial binder of coal tar pitch. The pyrolytic reactions cause the tar to decompose into a light volatile fraction which distills off leaving a residual carbon material which provides the bond.

If desired, the brick may be "coked" prior to use, by being baked in any suitable furnace provided with a non-oxidizing atmosphere. By heating, for instance, to 700° F. to 1800° F. over a period of 12 to 72 hours, depending upon the size of the shape, a partial or complete pyrolytic decomposition of the pitch is obtained leaving a residual tough and strong carbon bond throughout the brick.

In order to demonstrate the invention, the following examples are set forth for the purpose of illustration only. Any specific enumeration or detail mentioned should not be interpreted as a limitation of the invention unless specified as such in one or more of the appended claims and then only in such claim or claims.

In these examples, the bond reinforcement obtained in accordance with the present invention is indicated by comparing the increase in the mechanical coked crushing strength of specimens containing added carbon against specimens containing no carbon additive. The data given in Tables B to E clearly indicate that the added carbon not only increases the coked crushing strength and coked density of the refractory specimens, but also enhances the same properties in specimens which have not been coked and do not as yet have any carbon bond developed by pyrolytic decomposition. All screen sizings given are U.S. Standard; and the indicated percentages are by weight.

Example 1

A mixture of dead-burned dolomite comprising 20 parts by weight of a coarse fraction of which essentially 95 percent passed through a ⅜ inch sieve and all of which was retained on a 12 mesh screen, and 40 parts by weight of an intermediate sizing of which essentially 95 percent passed through a 6 mesh sieve and essentially all was retained on a 50 mesh sieve, was heated to approximately 300° F. and thoroughly mixed. Forty parts by weight of finely ground dead-burned magnesia, of which essentially 65 percent passed through a 200 mesh sieve, was then heated to approximately 300° F. and added to the mix. This granular refractory aggregate was tempered with a 5 percent addition of a molten pitch binder having a softening temperature within the range of 80° C. to 85° C. and thoroughly blended. Test specimens measuring 3.5 inches in diameter and about 2 inches in thickness were pressed from the hot (260° F.-280° F.) batch at 10,000 p.s.i. After cooling to room temperature, three of the six specimens pressed from each batch were evaluated in this form, that is, in the "green" state. The remaining three specimens were heated in the absence of oxygen and coked completely throughout the body of the specimens before being measured and compressively crushed.

A substitution of 2 percent of very finely powdered carbons of different types was made for the dead-burned magnesia fines in the above described formulation. The addition of carbon to the admixture was accompanied by a commensurate reduction in the amount of magnesia fines in order to maintain a uniform granulometric distribution among the comparative samples. The carbon was first added to the magnesia fines, milled for 0.5 hour in a pebble mill, the thoroughly blended mix heated to approximately 300° F., and then added to the heated granular dolomite fraction for blending and tempering according to the above described technique. The test results of the carbon types thus evaluated are given in Table B.

Example 2

A mixture of dead-burned dolomite comprising 15 parts by weight of coarse granules passing a ⅜ inch sieve but retained on a 0.1875 inch sieve; 22 parts by weight of intermediate sized granules passing 0.1875 inch sieve but retained on a 6 mesh sieve; and 23 parts by weight of finely sized granules essentially passing a 12 mesh sieve was heated to approximately 300° F. and thoroughly blended. Forty parts by weight of heated dead-burned magnesia fines were added to the mixture which was next tempered with 4.5 percent of added molten coal tar pitch binder, having a softening temperature in the range of 80° C. to 85° C., and thoroughly blended. Test cylindrical specimens were pressed and evaluated as described in Example 1.

Substitutions from 1 to 3 percent of a fine thermal carbon black were made for a like amount in the dead-burned magnesia fines. The carbon addition was, as described in Example 1, first made to the magnesia fines, milled, heated, then blended as described. The test results for these substitutions are given in Table C.

Example 3

Using the same granular refractory composition and procedure of Example 2, including the 2 percent carbon substitutions for magnesia fines, the percentages of coal tar pitch were increased. Three different carbon blacks were used in substitution for the magnesia fines. The comparison of test results for the resulting test specimens showing the improved properties of the added carbon containing specimens over those containing no added carbon for various percentages of pitch are given in Table D.

Example 4

It was indicated in Example 3 and in Table D that n increase in the pitch content increases the strength f the refractory, but not as markedly as the substitu- on of 2 percent fine thermal black for the fine fraction of granular refractory mixture. The attempts made to in- rease the pitch content of such mixes produced unwork- ble, excessively plastic, masses. It was found, however, ıat small additions of regular channel black carbon to ranular refractory mixtures containing fine thermal car- on blacks enable the addition of up to 6 percent pitch, ıereby giving the refractory the benefits of an increased itch content.

In this example, a mixture of dead-burned dolomite ɔnsisting of 15 parts by weight of coarse granules sieved › pass a ⅜ inch screen but retained on a 0.1875 inch :reen; 22 parts of intermediate sized grains sieved to ass a 0.1875 inch screen but retained on a 6 mesh :reen; and 23 parts of the batch composed of sized :anules essentially passing a 6 mesh sieve was heated › approximately 300° F. and thoroughly blended. inely divided dead-burned magnesia comprising 38 parts f the batch, essentially 65 percent of which passed a )0 mesh sieve, was heated to about 300° F. and added › the dolomite fraction.

Two parts by weight of a carbon black were added to the magnesia fines, milled for ½ hour, heated, blended with the dead-burned dolomite granules, tempered with pitch, and pressed into cylindrical test specimens as described in Examples 1 through 3. The carbon black of the present example consisted of fine thermal carbon black, regular channel carbon black, or mixtures thereof. A conductive oil furnace black could have been used in place of the regular channel black. The percentage of pitch added was varied from 4.5 to 6 percent.

Table E gives the test results of multiple carbon type additions for a granular refractory mixture tempered with varying amounts of coal tar pitch.

TABLE B.—CRUSHING STRENGTH AND DENSITY MEASUREMENTS

[Green and coked specimens 3½" dia. x 2" thick pressed at 5 tons per square inch]

| Formulation: | | Percent by weight |
|---|---|---|
| Dead-burned dolomite, coarse | | 20 |
| Dead-burned dolomite, intermediate | | 40 |
| Dead-burned magnesia fines | 38–40% | 40 |
| Carbon addition | 0–2% | |

| Carbon type* | Percent carbon | Percent pitch | Density, lbs./cu. ft. | | Crushing strength lbs./sq. in. | |
|---|---|---|---|---|---|---|
| | | | Green | Coked | Green | Coked |
| None—Control | 0 | 5.0 | 173 | 165 | 7,100 | 3,900 |
| Fine Thermal Black | 2 | 5.0 | 176 | 170 | 10,700 | 9,600 |
| Do | 2 | 5.0 | 176 | 169 | 9,900 | 8,000 |
| Regular Channel Black | 2 | 5.0 | 175 | 169 | 8,600 | 6,400 |
| Long Flow Channel Black | 2 | 5.0 | 172 | 167 | 6,700 | 5,300 |

*"Encyclopedia of Chemical Technology," Kirk and Othmer. The Interscience Encyclopedia, Inc., New York, 1949, volume 3, pages 34–60.

The adhesive properties of the coal-tar pitch binder for the refractory granules also seem to be increased by the addition of the powdered carbon. Refractory specimens which have not been coked generally show a marked improvement in the green compressive crushing strength over similar specimens to which no carbon additions have been made. As shown in Table C, carbon additions from 1 to 3 percent substantially increase the desirable properties of the pitch-bonded refractory. But up to 10 percent carbon may be added without deleterious results to the refractory.

TABLE C.—CRUSHING STRENGTH AND DENSITY MEASUREMENTS

[Green and coked specimens 3½" dia. x 2" thick pressed at 5 tons per square inch]

| Formulation: | | Percent by weight |
|---|---|---|
| Dead-burned dolomite, coarse | | 15 |
| Dead-burned dolomite, intermediate | | 22 |
| Dead-burned dolomite, fine | | 23 |
| Dead-burned magnesia fines | 37–40% | 40 |
| Carbon addition | 0–3% | |

| Carbon type | Percent carbon | Percent pitch | Density, lbs./cu. ft. | | Crushing strength, lbs./sq. in. | |
|---|---|---|---|---|---|---|
| | | | Green | Coked | Green | Coked |
| None—control | 0.0 | 4.5 | 179 | 167 | 7,700 | 2,700 |
| Fine thermal | 1.0 | 4.5 | 183 | 174 | 10,800 | 6,100 |
| Do | 1.5 | 4.5 | 184 | 177 | 12,600 | 7,400 |
| Do | 2.0 | 4.5 | 186 | 178 | 12,500 | 10,175 |
| Do | 2.5 | 4.5 | 185 | 177 | 14,400 | 8,400 |
| Do | 3.0 | 4.5 | 186 | 178 | 11,600 | 9,700 |

TABLE D.—CRUSHING STRENGTH AND DENSITY MEASUREMENTS

[Green and coked specimens 3½" dia. x 2" thick pressed at 5 tons per square inch]

| Formulation: | | Percent by weight |
|---|---|---|
| Dead-burned dolomite, coarse | | 15 |
| Dead-burned dolomite, intermediate | | 22 |
| Dead-burned dolomite, fine | | 23 |
| Dead-burned magnesia fines | 38–40% | 40 |
| Carbon addition | 0–2% | |

| Carbon type | Percent carbon | Percent pitch | Density, lbs./cu. ft. | | Crushing strength, lbs./sq. in. | |
|---|---|---|---|---|---|---|
| | | | Green | Coked | Green | Coked |
| None—control | 0.0 | 4.5 | 179 | 167 | 7,700 | 2,700 |
| Fine thermal | 2.0 | 4.5 | 185.6 | 178.3 | 12,500 | 10,175 |
| None—control | 0.0 | 5.5 | 183 | 174 | 11,150 | 6,375 |
| Reg. channel black | 2.0 | 5.5 | 183 | 178 | 12,000 | 10,000 |
| None—control | 0.0 | 6.0 | 182 | 176 | 10,000 | 8,000 |
| Long flow channel | 2.0 | 6.0 | 182 | 177 | 12,000 | 11,000 |

TABLE E.—CRUSHING STRENGTH AND DENSITY MEASUREMENTS

[Green and coked specimens 3½" dia. x 2" thick pressed at 10,000 lbs. per square inch]

| Formulation: | Percent by weight |
|---|---|
| Dead-burned dolomite, coarse | 15 |
| Dead-burned dolomite, intermediate | 22 |
| Dead-burned dolomite, fine | 23 |
| Dead-burned magnesia fines | 38 |
| Carbon addition | 2 |

| Carbon type | Percent carbon | Percent pitch | Density, lbs./cu. ft. | | Crushing strength, lbs./sq. in. | |
|---|---|---|---|---|---|---|
| | | | Green | Coked | Green | Coked |
| Fine thermal | 2.0 | 4.5 | 185 | 177 | 14,000 | 9,800 |
| Do | 1.75 | 4.5 | 185 | 176 | 11,700 | 9,800 |
| Long flow channel | 0.25 | | | | | |
| Fine thermal | 1.50 | 4.5 | 185 | 177 | 13,000 | 11,000 |
| Long flow channel | 0.50 | | | | | |
| Do | 2.0 | 5.0 | 181 | 174 | 10,700 | 7,200 |
| Fine thermal | 1.25 | 5.0 | 186 | 178 | 14,400 | 9,800 |
| Long flow channel | 0.75 | | | | | |
| Fine thermal | 1.0 | 5.0 | 184 | 177 | 13,700 | 9,800 |
| Long flow channel | 1.0 | | | | | |
| Fine thermal | 0.5 | 5.0 | 183 | 175 | 11,500 | 8,700 |
| Long flow channel | 1.5 | | | | | |
| Fine thermal | 1.0 | 5.5 | 183 | 175 | 12,700 | 10,300 |
| Long flow channel | 1.0 | | | | | |
| Fine thermal | 1.0 | 6.0 | 183 | 174 | 13,700 | 9,700 |
| Long flow channel | 1.0 | | | | | |

The binder of carbonaceous material is not per se considered novel in this improved pitch-bonded refractory composition, but as its concentration does influence the carbon bond formation, a percentage by weight of 4 percent to about 10 percent is preferably used. Increasing the binder pitch content improves certain properties of the refractory, but powdered carbon additions to these formulations increase the desired properties above those of similar pitch content. Table D compares various pitch concentrations with and without carbon additions.

The nature of the carbon bond is also influenced by the parent carbonaceous material selected for the refractory binder. The pitch binder may be selected on the basis of its softening points, such as

41–44° C.
80–85° C.
90–95° C.
100–105° C.

based on the desired end result, but a pitch having a softening point between 80–85° C. is preferably used.

Other forms embodying the features of the invention may be employed, change being made as regards the features herein disclosed, provided those stated by any of the following claims or the equivalent of such features be employed.

I, therefore, particularly point out and distinctly claim as my invention:

[1. In the method of admixing basic refractory particles with sufficient carbonaceous material capable of pyrolytic decomposition selected from the group consisting of pitch, coal tar and bituminous asphalt to bind said particles together; the improvement which consists of adding to the admixture approximately 0.5 to 10 percent by weight, based on the weight of the total admixture, of powdered carbon black of non-crystalline structure.]

2. In the method of forming a shaped, [green] *grain* refractory article by admixing dead-burned basic refractory particles with sufficient pitch capable of pyrolytic decomposition to bind said particles together and then shaping the admixture by pressure; the improvement which consists of adding approximately 0.5 to 10 percent by weight, based on the weight of the total admixture, of finely divided carbon black to the admixture prior to such shaping [.] *to produce such a shape of increased density and crushing strength, such carbon black having an average particle size of about 20 to about 500 millimicrons and a surface area of from about 5 to about 375 square meters per gram, at least one third of the carbon black being thermal black having an average particle diameter of about 180–470 millimicrons and a surface area of about 6–13 square meters per gram.*

[3. In the method of admixing dead-burned basic refractory particles with sufficient coal tar pitch to bind said particles together and then heating the admixture pyrolytically to decompose the pitch and form a carbon bond for the particles; the improvement which consists of adding to the admixture prior to the heating approximately 0.5 to 10 percent by weight, based on the weight of the total admixture, of powdered carbon black to improve the properties of the resulting bonded refractory.]

4. In the method of bonding dead-burned basic refractory particles one to another by admixing such particles with about 4 percent to about 10 percent by weight of the admixture coal tar pitch and then heating to coke the admixture and form a bonded mass; the improvement which consists of incorporating approximately 0.5 to 10 percent by weight, based on the weight of the total admixture, of powdered carbon black in the admixture prior to heating to improve the useful life of the bonded mass at elevated temperatures[.], *such carbon black having an average particle size of about 20 to about 500 millimicrons and a surface area of from about 5 to about 375 square meters per gram, at least one third of the carbon black being thermal black having an average particle diameter of about 180–470 millimicrons and a surface area of about 6–13 square meters per gram.*

5. In the method of bonding refractory particles selected from the group consisting of dead-burned dolomite, dead-burned magnesia, and mixtures thereof by blending such particles with sufficient coal tar pitch to bind such particles together, shaping such blend, and then heating the resulting shape to a temperature sufficient to decompose pyrolytically the pitch and form a carbon bond; the improvement which consists of adding to the blend prior to the heating from about 0.5 percent to about 10 percent by weight thereof finely divided carbon black[.] *to increase the density and crushing strength of such shape, such carbon black having an average particle size of from about 20 to about 500 millimicrons and a surface area of about 5 to about 375 square meters per gram, at least one third of the carbon black being thermal black having an average particle diameter of about 180–470 millimicrons and a surface area of about 6–13 square meters per gram.*

6. The method of claim 5 wherein such carbon black is selected from the group consisting of lamp blacks, channel blacks, furnace combustion blacks, thermal blacks and acetylene blacks.

7. The method of claim 5 wherein such carbon black as [properties within the following ranges:

Average particle diameter __ 200 to 500 millimicrons.
Surface area _____ 5 to 375 square meters per gram.
Volatile content _____ Less than 14% by weight.
Fixed carbon _____ 85 to 99.5% by weight.]

*volatile content of less than 14 percent by weight and a fixed carbon content of 85 to 99.5 percent by weight.*

8. *In the method of bonding refractory particles selected from the group consisting of dead-burned dolomite, dead-burned magnesia and mixtures thereof by blending such particles with sufficient coal tar pitch to bind such particles together, shaping such blend, and then heating the resulting shape to a temperature sufficient to decompose pyrolytically the pitch and form a carbon bond; the improvement which consists of adding to the blend prior to the heating from about 0.5 percent to about 10 percent by weight thereof finely divided carbon black* The method of claim 5 wherein], such carbon black consists] *consisting* essentially of a blend of high oil absorbing carbon black and a thermal carbon black.

9. *In the method of bonding refractory particles selected from the group consisting of dead-burned dolomite, dead-burned magnesia and mixtures thereof by blending such particles with sufficient coal tar pitch to bind such particles together, shaping such blend, and then heating the resulting shape to a temperature sufficient to decompose pyrolytically the pitch and form a carbon bond; the improvement which consists of adding to the blend prior to the heating from about 0.5 percent to about 10 percent by weight thereof finely divided carbon black* The method of claim 5 wherein], such carbon black consists] *consisting* essentially of a blend of a high oil absorbing carbon black having an oil absorption of at least 85 pounds of oil per 100 pounds of black and a thermal carbon black, said carbon black being present within a weight ratio of 2:1 to 1:2, respectively.

10. *In the method of bonding refractory particles selected from the group consisting of dead-burned dolomite, dead-burned magnesia and mixtures thereof by blending such particles with sufficient coal tar pitch to bind such particles together, shaping such blend, and then heating the resulting shape to a temperature sufficient to decompose pyrolytically the pitch and form a carbon bond; the improvement which consists of adding to the blend prior to the heating from about 0.5 percent to about 10 percent by weight thereof finely divided carbon black* The method of claim 5 wherein], such carbon black consists] *consisting* essentially of a blend of substantially equal parts by weight of a high oil absorbing carbon black selected from the group consisting of a conductive oil furnace carbon black and a long flow channel carbon black having an oil absorption of at least 85 pounds of oil per 100 pounds of black, and a fine thermal carbon black.

11. In the method of bonding refractory particles selected from the group consisting of dead-burned dolomite, dead-burned magnesia, and mixtures thereof by blending such particles with sufficient coal tar pitch to bind said particles together, shaping such blend under pressure, and then heating the resulting shape to a temperature sufficient to decompose pyrolytically the pitch and form a carbon bond, the improvement which consists of adding to the blend prior to shaping approximately 0.5 to 10 percent by weight, based on the weight of the total admixture, of powdered carbon black containing particles having a diameter within the range of from about 20 millimicrons to about 500 millimicrons[.] *to increase the density and crushing strength of such carbon bonded shape, at least one third of such carbon black being thermal carbon black having an average particle diameter within the range of about 180 to about 470 millimicrons.*

[12. In the method of bonding refractory particles selected from the group consisting of dead-burned dolomite, dead-burned magnesia, and mixtures thereof by blending such particles with sufficient coal tar pitch to bind said particles together, shaping such blend and then heating the resulting shape to a temperature sufficient to decompose pyrolytically the pitch and form a carbon bond; the improvement which consists of adding to the blend prior to heating from about 1 percent to about 3 percent by weight thereof of finely divided carbon black having properties within the following ranges:

Average particle diameter __ 120 to 500 millimicrons.
Surface area _____ 6 to 13 square meters per gram.
Volatile content _____ Less than 1% by weight.
Fixed carbon _____ 95 to 99.5% by weight.]

[13. A refractory article of manufacture consisting essentially of basic refractory particles, sufficient carbonaceous material capable of pyrolytic decomposition selected from the group consisting of pitch, coal tar and bituminous asphalts to bind said particles together and approximately 0.5 to 10 percent by weight, based on the weight of the total admixture, of finely divided carbon black of non-crystalline structure.]

14. A refractory article of manufacture consisting essentially of basic refractory particles, carbon black and a pyrolytically decomposed carbonaceous material selected from the group consisting of pitch, coal tar and bituminous asphalts, approximately 0.5 to 10 percent by weight, based on the weight of the total admixture, of said carbon black being present prior to such pyrolytic decomposition[.], *said refractory article having increased density and crushing strength and said carbon black having an average particle size of from about 20 to 500 millimicrons and a surface area of about 5 to about 375 square meters per gram, at least one third of such carbon black being thermal black having an average particle diameter of about 180–470 millimicrons and a surface area of about 6–13 square meters per gram.*

*15. The method of claim 11 in which such powdered carbon black consists essentially of a blend of a high oil absorbing carbon black and a thermal carbon black, said carbon black being present within the weight ratio of 2:1 to 1:2 respectively.*

*16. A pitch-bonded refractory having high strength and increased density comprising*

*basic refractory particles,*

*sufficient carbonaceous material selected from the group consisting of pitch, coal tar and bituminous asphalts, capable of pyrolytic decomposition, to bind said particles together, and*

*approximately 0.5 to 10% by weight, based on the weight of the total admixture, of finely divided carbon black of noncrystalline structure, said carbon black having an average particle size of from about 20 to 500 millimicrons and a surface area from about 5 to about 375 square meters per gram, at least on third of the carbon black being thermal carbon black having an average particle diameter of from about 180 to about 470 millimicrons and a surface area of about 6–13 square meters per gram.*

*17. The refractory of claim 16 in which said finely divided carbon black consists essentially of a blend of a high oil absorbing carbon black and said thermal carbon black.*

*18. The refractory of claim 17 wherein the ratio of high oil absorbing carbon black to thermal carbon black is in the range of about 2:1 to about 1:2 respectively.*

*19. The refractory of claim 17 wherein said oil absorbing carbon black has an oil absorption of at least about 85 pounds of oil per 100 pounds of carbon black.*

*20. The refractory of claim 19 including about 4 to about 10% of carbonaceous material.*

*21. The refractory of claim 16 wherein the carbon black addition is substantially all thermal black.*

*22. The method of claim 5 wherein such carbon black comprises about 66 percent by weight to about 33 percent by weight thermal black.*

References Cited

The following references, cited by the Examiner, are of record in the patented file of this patent or the original patent.

UNITED STATES PATENTS

| | | | |
|---|---|---|---|
| 2,330,418 | 9/1943 | Gitzen | 106—56 |
| 2,563,285 | 8/1951 | Shea et al. | 106—56 |

| | | | |
|---|---|---|---|
| 3,070,449 | 12/1962 | Davies et al. | 106—58 |
| 3,210,205 | 10/1965 | Shurtz | 106—58 |

FOREIGN REFERENCES

| | | | |
|---|---|---|---|
| 118,590 | 6/1944 | Australia | 106—56 |
| 614,742 | 2/1961 | Canada | 106—56 |

JAMES F. POER, Primary Examiner

U.S. Cl. X.R.

106—58, 63